June 18, 1957     J. W. BROWN     2,796,391
PROCESS FOR CONVERSION OF HEAVY HYDROCARBONS
Filed June 19, 1953
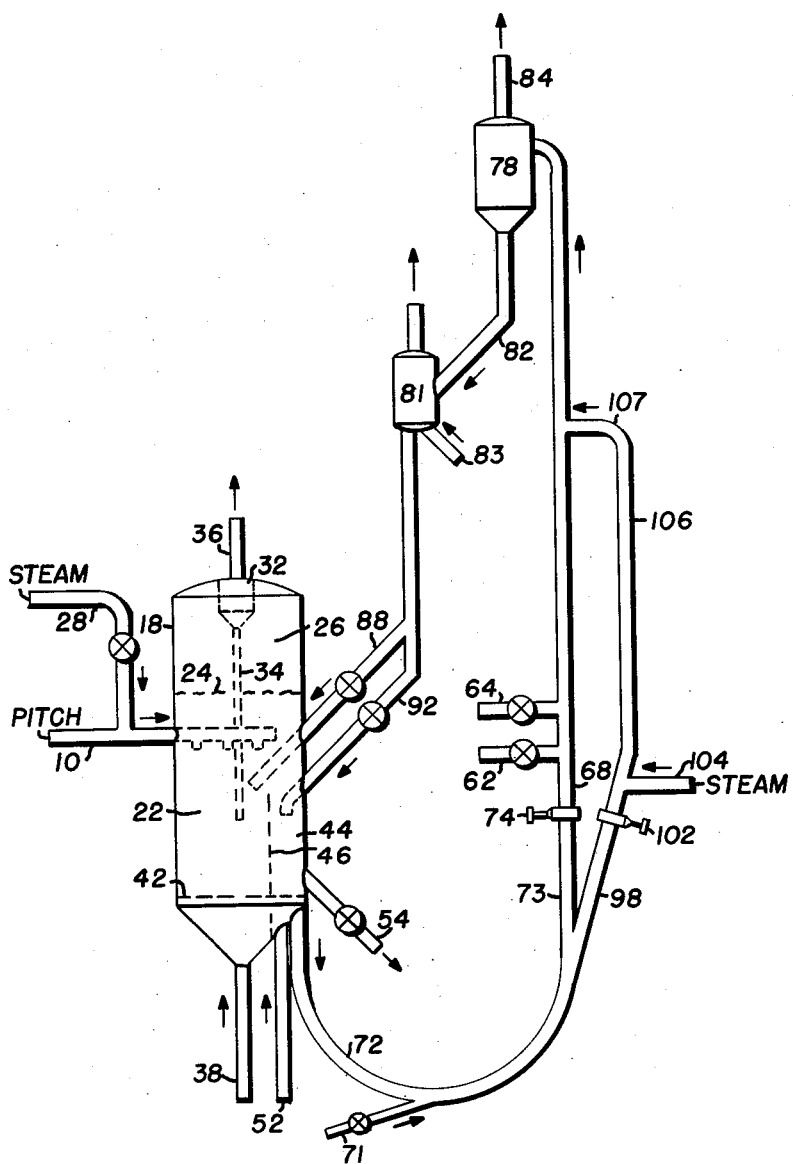
James W. Brown     Inventor
By Peter H. Smolka     Attorney United States Patent Office 2,796,391
Patented June 18, 1957

2,796,391

PROCESS FOR CONVERSION OF HEAVY HYDROCARBONS

James W. Brown, Mountainside, N. J., assignor to Esso Research and Engineering Company, a corporation of Delaware Application June 19, 1953, Serial No. 362,850

4 Claims. (Cl. 202—14)

This invention relates to a process for producing comparatively low boiling hydrocarbons such as gas oil, by coking of heavy hydrocarbonaceous materials. More particularly the invention relates to a process wherein residual hydrocarbon oils are contacted with a dense fluidized mass of coke particles or other inert solids in a coker at coking temperature whereupon the solids are rapidly heated to a higher temperature in a high velocity transfer line heater prior to returning the reheated solids to the coker. The specific improvement characteristic of the present invention is the mixing of comparatively cool solids from the coker with the reheated solids prior to the return of the latter to the coker. This reduces the temperature of the circulating solids and hence permits a desirably high solids circulation rate as well as a high hydrocarbon feed rate.

Processes for coking residual hydrocarbon oils in contact with a fluidized bed of finely divided and essentially inert solids are well known. In such processes the necessary heat of reaction is usually supplied by withdrawing a portion of the fluidized solids from the coker to a separate heating zone wherein the solids may be heated while maintained either as a dense fluidized bed in a large vessel or as a rapidly flowing dilute suspension in a narrow transfer line. The latter technique has several advantages particularly because of equipment size, lower operating pressure, and better surface properties of the reheated solids because of the higher heating temperatures. Because of the high velocity and correspondingly short residence time, high temperatures of at least 1250 to 1700° F. are normally essential in the transfer line burner so as to obtain adequate combustion rates. At the same time, for a given heat requirement in the coking reactor these high heating temperatures reduce the input of dry conditioned coke to the reactor, and hence the permissible hydrocarbon feed rate. It has been demonstrated that the maximum allowable feed rate to a fluidized coking zone is decreased when the average residence time of the solids in the reactor is increased, and that fluidization difficulties will be encountered if this permissible feed rate is exceeded. Consequently, high temperature heating of solids in a transfer line normally imposes an undesirable limitation on hydrocarbon feed rate and hence on the capacity of a given unit.

It is the object of the present invention to retain the advantages of transfer line heating while at the same time increasing the permissible solids circulation rate and hence the permissible hydrocarbon feed rate in a coking process employing a dense bed of fluidized inert solids. A more specific object is to reheat the circulating solids to a temperature only about 100 or 150 to 300° F. above coking temperature so that a high solids input as well as a high liquid feed rate to the coking reactor becomes possible. A still further object is to reduce the average residence time of the solids in the reactor. These and other objects as well as the nature and advantages of the invention will become more clearly apparent from the following description when read with reference to the accompanying drawing.

The drawing is a schematic illustration of a specific embodiment of the invention wherein a petroleum pitch is coked in contact with a dense fluidized mass of inert solids and wherein the necessary heat of reaction is supplied by circulating a portion of the coker solids through a transfer line heater.

Referring to the drawing, petroleum pitch is preheated by conventional means to about 400 to 800° F., e. g. 700° F., that is, to an elevated temperature somewhat lower than actual cracking temperature. The preheated feed is introduced or sprayed through line 10 into coking vessel 18, after mixing with superheated steam introduced through line 28 if desired. A ratio of about 0 to 0.1 lb., e. g. 0.02 lb. of steam per pound of pitch may be used. The pitch may have a gravity of about $-10$ to 20° API, e. g. 7° API, a Conradson carbon of about 5 to 50 weight percent, e. g. 20 weight percent and an initial atmospheric boiling point at about 850 to 1100° F., e. g. 1050° F. Vessel 18 contains coke particles ranging in size from about 20 to 500 or 1000 microns, mostly 80 to 300 microns, which are maintained in the form of a dense turbulent fluidized mass 22 having an upper level 24 above which is a dilute phase 26. The coke particles are maintained fluidized by the upflowing hydrocarbon vapors formed by the coking of the pitch and also by superheated steam which is introduced into vessel 18 through line 38 below distribution grid 42. The steam addition rate is adjusted so as to provide a total superficial upward gas velocity of about 1 to 6 ft./sec., a minimum velocity of about 1 ft./sec. near the bottom of the bed being generally desirable for good fluidization. The gas velocity tends to increase at progressively higher levels in the reactor due to the evolution of increasing amount of hydrocarbon vapors by coking of the heavy feed. The density of the fluidized coke may be between about 10 and 60 lbs./cu. ft., or about 40 lbs./cu. ft. under the preferred conditions of this example. The fluidized coking bed 22 is maintained at a temperature between about 800 and 1200° F., preferably about 950° F. The pressure in the upper part of coking vessel 18 is preferably essentially atmospheric, e. g. about 10 p. s. i. g., though higher pressures up to about 100 p. s. i. g. may be used similarly. Of course, the pressure at the bottom of vessel 18 is considerably higher than at the top, due to the hydrostatic head exerted by the fluidized solids.

Vaporous products of coking pass overhead from fluidized bed 22. These vapors contain some entrained solids and form the dilute phase 26. The vapors are passed through gas-solids separating means 32 such as one or more cyclones which separate entrained solids and return them to the dense fluidized bed 22 by means of dip pipe 34. The more or less dust free vapors then pass overhead through line 36 for further treatment in a recovery system which may include a fractionating tower, a catalytic cracking unit, and other conventional equipment.

As the hydrocarbon feed is coked in vessel 18, it is endothermally decomposed into hydrocarbon vapors as well as a solid carbonaceous material or coke. This solid material deposits in film like layers on the finely divided fluidized particles, causing a continuous growth in particle size. Consequently, both to maintain the particles in a readily fluidizable particle size range and to supply the necessary heat of coking, a portion of the solid particles is continuously withdrawn from fluid bed 22 for reheating and proper size reduction. For this reason it is desirable to provide a stripping zone 44 by installing a partition 46 in the fluidized bed 22 of coking vessel 18. In this fashion coke particles overflow into stripping zone 44 where they are stripped of volatile hydrocarbons by superheated steam or other inert gas introduced through line 52. Some of the stripped coke particles may be withdrawn from the lower portion of the stripping zone through line 54 and recovered after suitable quenching or cooling.

The remainder of the stripped coke particles may be withdrawn from stripper 44 through standpipe 72 and passed to the heating system. Line 72 preferably constitutes the down-leg of a branched U-bend through which the solids pass. An inert gas such as steam is injected at the bottom of the U-bend through line 71 in an amount sufficient to keep the solids free flowing in the reverse standpipes or branched up-legs 73 and 98 of the U-bend. Slide valves 74 and 102 may be provided on the reversed standpipes to regulate the flow of solids into the heater 68 and lift line 106, the function of which will be described later.

The solids admitted through valve 74 into heater 68 may be mixed with air admitted through line 64, and a part of the solids in the heater is thus consumed while the remainder is heated. The air is introduced into heater 68 in a sufficient quantity to suspend the solids in the form of a dilute solids-in-gas dispersion which passes through heater 68 at a linear gas velocity of about 20 to 100 ft./sec. for instance, about 0.03 lb. of air may be admitted through line 64 for every pound of coke passing through valve 74. As a result of the combustion taking place in heater 68 the solids are heated to a temperature of about 1250 to 1600° F., e. g. 1500° F.

Alternatively, if coke is more valuable than gas, the coke may be heated to the aforementioned temperature by injecting an extraneous fuel such as hydrocarbon gas through line 62 into heater 68, so that the gas is burned in preference to coke upon mixing with the air introduced through line 64. In such a scheme the coke present in heater 68 is heated primarily by direct heat exchange with the hot flue gases. As still another alternative, heat may be supplied by combustion of extraneous fuel entirely outside of the transfer line heater, i. e. in an auxiliary burner, which may then discharge its hot flue gases into the heater line 68 substantially as illustrated in the parent application Serial No. 230,020, filed on June 5, 1951. Heat again will be supplied to the coke by transfer from the hot flue gases.

However, in previously proposed systems the circulating coke has been heated rapidly to the aforementioned maximum temperature, either by combustion of the coke itself or by contact with hot flue gases, so that the tolerable input of dry conditioned coke to the coking vessel has been excessively limited. This disadvantage is overcome by the present invention which permits retaining both the advantages of transfer line burning and a high input of dry coke to the coking vessel.

Specifically, the present improvement proposes passing only a portion of the circulating spent coke, say about 10 to 35 weight percent, through the heater proper while the remaining 90 to 65 percent of the circulating coke is allowed to by-pass the heater and is remixed with the heated portion in a conditioning stage following the heater proper. Consequently, a dry conditioned coke mixture of relatively moderate temperature is obtained and the permissible coke circulation rate is increased.

Again referring to the drawing, the present invention involves taking a portion of the stripped spent coke, e. g. about 80% of the coke in line 72, as a separate sidestream represented by reverse standpipe 98 provided with flow regulating valve 102, while only about 20% passes through line 73 into heater 68. The coke which is allowed to pass through valve 102 is picked up by steam or other essentially inert lift gas introduced through line 104 and the resulting dilute suspension is passed through transfer line 106 for introduction into transfer line heater 68 at a point 107 which is a substantial distance above the point of injection of the air or heating gas through line 64.

For instance, the distance from air inlet 64 to cool coke inlet 107 may constitute about 60 to 90% of the heater length from air inlet 64 to the point where heater 68 discharges into cyclone 78, the total heater length being, for instance, about 50 to 100 feet. In other words, the hot gas may pass through the actual heating portion of line 68 from air inlet 64 to coke inlet 107 in a maximum of about 5 seconds, preferably in 1 or 2 seconds, whereas it may pass through the quenching portion from inlet 107 to cyclone 78 in less than 3 seconds, e. g. about 1 second. The coke residence time in the respective portions of the heater is only slightly longer than the gas time, since at the high velocities slippage of solids in the gas is relatively inconsequential.

In this way the 20% of the circulating coke may be heated in line 68 to about 1500° F. by the time it reaches point 107 where the remaining 80% of the coke is reinjected at about 950° F. This rapidly quenches the temperature of the directly heated coke, producing a coke mixture of about 1070° F. The prompt quenching to temperatures of 1100° F. or lower is also very beneficial since it reduces the temperature of the mixture to a level where wasteful carbon monoxide formation is largely avoided.

The coke mixture then continues on its passage through the remainder of line 68 where heat equalization is completed and the low temperature coke from line 106 is effectively dried and conditioned due to the low hydrocarbon vapor pressure prevailing in this part of the system. The dried coke mixture then enters cycline 78 for separation of the gases therefrom. These gases may be rejected through line 84 while separated reconditioned coke particles are finally returned to coking vessel 18 through lines 82, 88 and 92. The returning solids preferably pass also through a soaking vessel 81 where the coke is held for up to 1 or 2 minutes, to complete drying and conditioning at 1050–1070° F. Superheated steam may be introduced through line 83 to fluidize and strip the coke. Most of the reheated coke thus may enter the coking vessel through line 88 whereby it supplies the necessary heat of reaction to the fluidized bed 22 where the coking reaction is taking place. Depending on the coking temperature, temperature of the reheated coke, feed quality, size of the unit and other readily appreciated variables, about 1 weight of hot coke per minute may be circulated to the coking reactor for each 5 to 20 weights of coke being held up in the reactor. A portion of the reheated coke may also preferably discharge through line 92 directly into the stripipng compartment 44 whereby the latter can be kept at a higher temperature than bed 22 and the stripping efficiency accordingly increased.

The foregoing description of the general nature as well as a specific embodiment of the invention will make it readily apparent that numerous variations or modifications may be made therein without departing from its scope or spirit. For instance, while specific pitch obtained by vacuum distillation of crude petroleum has been given as an exemplary feed, the invention is generally useful in the coking of all kinds of hydrocarbons containing substantial amounts of fractions boiling above about 900° F., whether of petroleum or coal tar origin. Thus suitable feeds may include whole crude, reduced crude, heavy virgin bottoms, heavy catalytic cycle oil, as well as coal tar pitch, shale oil and the like. Likewise, while the fluidized solids have been described as petroleum coke, other essentially inert refractory materials such as spent siliceous cracking catalyst, pumice, or kieselguhr may be used similarly.

Process-wise also the invention may be modified in various ways. For instance, instead of withdrawing spent coke from the coking reactor as a single stream and splitting it into the two required streams only later, the coke required for quenching the reheated coke may be withdrawn as a separate stream directly from the reactor. Likewise, instead of transporting the spent coke from the coking reactor to the heater through a U-bend which includes a dense phase up-leg, it is possible to use a conventional vertical standpipe having a slide valve near its bottom and discharging into a conventional transfer line where the solids are picked up in dilute phase by an appropriate lift gas. Still other modifications may be thought of by those skilled in the art.

The present application is a continuation-in-part of my copending application Serial No. 230,020, filed on June 5, 1951, now U. S. Patent 2,700,017.

The invention for which patent protection is desired is particularly defined in the appended claims.

The claims:

1. A process of coking a heavy hydrocarbon oil to produce lower boiling hydrocarbons which comprises feeding the heavy hydrocarbon oil to a dense fluidized highly turbulent bed of finely divided coke particles maintained in a coking zone at a coking temperature of about 800 to 1200° F., removing vaporous reaction products overhead, withdrawing coke particles from said fluidized bed to a stripping zone, passing superheated steam upwardly through the stripping zone to strip volatile hydrocarbons from said withdrawn coke, removing freshly stripped coke from the stripping zone, suspending a first portion of the removed coke in air to form a dilute suspension, passing the resulting dilute suspension at a velocity of at least 20 ft./sec. through a narrowly confined elongated heating zone for a period of about 1 to 5 seconds whereby the coke is partially burned and the remainder dried in the resulting flue gases and reheated to a temperature of at least 1250° F., suspending another portion of the freshly stripped coke in steam to form a relatively cool dilute suspension essentially at said coking temperature, injecting the coke-in-steam suspension into the reheated coke portion in the elongated heating zone in a proportion of about 10 to 35 weight percent of reheated coke to about 90 to 65 weight percent of the relatively cool coke, passing the resulting mixture of coke and suspending gases through a conditioning zone at a rate corresponding to a conditioning time of about 1 to 3 seconds, separating the gases from the conditioned coke particles, and returning the separated coke to said coking zone to supply heat thereto.

2. A process according to claim 1 wherein the coke particles in the coking zone range in size mostly from about 80 to 300 microns.

3. A process according to claim 2 wherein the coking temperature is about 950° F. and the first portion of coke is reheated to about 1400° F. prior to admixing with the relatively cool second portion of coke.

4. A process according to claim 1 wherein a part of the heated coke mixture is returned directly to the stripping zone to maintain the latter at a higher temperature than the coking zone.

References Cited in the file of this patent

UNITED STATES PATENTS

| | | |
|---|---|---|
| Re. 17,181 | McEwen | Jan. 1, 1929 |
| 1,497,333 | Helbig | June 10, 1924 |
| 2,314,112 | Tuttle | Mar. 16, 1943 |
| 2,403,608 | Payne et al. | July 9, 1946 |
| 2,445,328 | Keith | July 20, 1948 |
| 2,527,575 | Roetheli | Oct. 31, 1950 |
| 2,543,884 | Weikart | Mar. 6, 1951 |
| 2,606,861 | Eastwood | Aug. 12, 1952 |
| 2,623,010 | Schutte | Dec. 23, 1952 |
| 2,661,324 | Leffer | Dec. 1, 1953 |
| 2,698,284 | Adams | Dec. 28, 1954 |
| 2,700,017 | Brown | Jan. 18, 1955 |

FOREIGN PATENTS

| | | |
|---|---|---|
| 656,517 | Great Britain | Aug. 22, 1951 |